United States Patent
Nonaka et al.

(10) Patent No.: US 7,652,097 B2
(45) Date of Patent: Jan. 26, 2010

(54) POLYMERIC COMPOSITION, POLYMER-EXTRUDED ARTICLE AND WEATHER STRIP FOR AUTOMOTIVE VEHICLE

(75) Inventors: Ryoko Nonaka, Chiba (JP); Masakazu Manaka, Chiba (JP)

(73) Assignee: Kinugawa Rubber Ind. Co., Ltd., Chiba-shi (JP)

( * ) Notice: Subject to any disclaimer, the term of this patent is extended or adjusted under 35 U.S.C. 154(b) by 314 days.

(21) Appl. No.: 11/377,201

(22) Filed: Mar. 17, 2006

(65) Prior Publication Data

US 2006/0258793 A1 Nov. 16, 2006

(30) Foreign Application Priority Data

Mar. 18, 2005 (JP) ............................. 2005-078313

(51) Int. Cl.
*C08K 3/04* (2006.01)
(52) U.S. Cl. ....................... 524/495; 524/502
(58) Field of Classification Search ................. 524/495, 524/502

See application file for complete search history.

(56) References Cited

U.S. PATENT DOCUMENTS

2004/0106760 A1 6/2004 Sassa

FOREIGN PATENT DOCUMENTS

| JP | 06-183305 A | | 7/1994 |
|---|---|---|---|
| JP | 06-183305 A | | 7/1994 |
| JP | 8-012797 A | | 1/1996 |
| JP | 2000-063600 A | | 2/2000 |
| JP | 2000-226464 A | | 8/2000 |
| JP | 2000-344980 A | | 12/2000 |
| JP | 2001-040129 A | | 2/2001 |
| JP | 2001-1040129 | * | 2/2001 |
| JP | 20001040129 | * | 2/2001 |
| JP | 2002-053717 A | | 2/2002 |
| JP | 2003-105138 (A) | | 4/2003 |
| JP | 2005-041986 A | | 2/2005 |

OTHER PUBLICATIONS

JIS B 0601, 2001.
JIS B 0601-1982, Definitions and Designation of Surface Roughness, 1982, pp. 1-12 English translation included.

* cited by examiner

*Primary Examiner*—Robert D. Harlan
(74) *Attorney, Agent, or Firm*—Foley & Lardner LLP

(57) ABSTRACT

A polymer-extruded article produced by extrusion and vulcanization of a polymeric composition includes ethylene-α-olefin-nonconjugated polyene copolymer in an amount of 100 phr; carbon black in an amount ranging from more than 50 to 120 phr, the carbon black having an arithmetic average particle diameter of not smaller than 60 nm; a softener in an amount of not more than 100 phr; and thermo-expansive capsules in an amount ranging from 1 to 10 phr. The polymer-extruded article includes a surface section having an uneven surface derived from thermal expansion of the thermo-expansive capsules, and a rough surface derived from carbon particle of the carbon black and formed at the uneven surface derived form the thermal expansion of the thermo-expansive capsules.

7 Claims, 5 Drawing Sheets

POLYMERIC COMPOSITION, POLYMER-EXTRUDED ARTICLE AND WEATHER STRIP FOR AUTOMOTIVE VEHICLE

BACKGROUND OF THE INVENTION

This invention relates to a polymeric composition, a polymer-extruded article and a weather strip for an automotive vehicle, to be used, for example, for a door panel, glass and the like.

A vulcanized formed body (referred hereafter as to polymer-extruded article) formed of a polymeric composition in which a polymer material such as a rubber material or the like is blended is applied to a variety of uses. Research and development has been made on the polymer-extruded article to meet the characteristics according to the uses. For example, as a technique for achieving a weight-lightening for the polymer-extruded article applied to a weather strip, the following technique is known: The polymeric composition in which thermo-expansive micro-capsules (referred hereinafter to as thermo-expansive capsules) is blended is used. During valcanization of the polymeric composition, the thermo-expansive capsules are thermally expanded (slightly foamed). This tries to lower the specific gravity of the above-mentioned polymer-extruded article while to obtain a sufficient hardness, as disclosed in Japanese Provisional Publication No. 6-183305.

Additionally, the above-mentioned polymer-extruded article is low in sliding characteristics and adherence resistance to an object (referred hereinafter to as object to be used; for example, a door panel, a glass and the like) for which the polymer-extruded article is used. In order to improve the sliding characteristics and adherence resistance, a surface treatment agent including a polymer elastomeric material is applied on a surface (at least surfaces of sections requiring various characteristics) of the polymer-extruded article.

Examples of the characteristics required for the above-mentioned surface treatment agent are improvements in sliding characteristics (for example, a characteristics for preventing low grade noise due to stick-slip from generation in case that the polymer-extruded article is used to be slidably movable to the object to be used) of the surface of the polymer-extruded article against the object to be used, adherence resistance (for example, a characteristics for preventing the polymer-extruded article from making its functional degradation due to adhesion of the polymer material to the object to be used), water repellency (for example, a characteristics for preventing freezing of the polymer-extruded article), and the like.

For example, in case of a weather strip constituting a seal section (for example, a seal section formed of a foamed rubber), a surface treatment agent is coated onto the seal section thereby preventing adherence between the seal section and a door panel when a door is opened or closed so as to avoid difficulty in opening and closing of the door. Even in a cold district, the seal section can be prevented from freezing. Additionally, in case of use in which the surface of the above-mentioned polymer-extruded article is in sliding contact with the glass, the door panel or the like, the sliding characteristics of the polymer-extruded article is improved with the above-mentioned surface treatment agent thereby preventing generation of the low grade noise due to the stick-slip.

As the above-mentioned surface treatment agent, for example, one formed by adding diorganopolysiloxane to hardenable polyurethane is known. This surface treatment agent is coated on the polymer-extruded article thereby improving the sliding characteristics, adherence resistance, water repellency and the like.

SUMMARY OF THE INVENTION

However, in case that the surface treatment agent is coated onto the polymer-extruded article as discussed above, there are fears of formation of coating macula (for example, the coating macula is formed owing to non-uniform coating of the surface treatment agent) according to coating conditions (for example, the temperature, viscosity and the like of the surface treatment agent during coating, and the temperature and the like of the polymer-extruded article as an object to be coated) for the surface treatment agent, and of making insufficient the thickness of a layer (referred hereafter to as surface treatment layer) formed of the coated surface treatment agent.

Accordingly, there are fears of lowering the productivity (workability, yield of product and the like), and of making it impossible to obtain sufficient sliding characteristics, adherence resistance, water repellency and the like thereby making it impossible to sufficiently exhibit the functions and the like of the polymer-extruded article.

Therefore, it is an object of the present invention to provide improved polymeric composition, polymer-extruded article and weather strip for an automotive vehicle, capable of overcoming drawbacks encountered in conventional similar polymeric composition, polymer-extruded article and weather strip for an automotive vehicle.

Another object of the present invention is to provide improved polymeric composition, polymer-extruded article and weather strip for an automotive vehicle, capable of sufficiently exhibit the intended function of the polymer-extruded article, improving its sliding characteristics, adherence resistance, water repellency without degrading productivity even though no surface treatment agent is coated on the polymer-extruded article.

An aspect of the present invention resides in a polymeric composition used for a polymer-extruded article produced by extrusion and valcanization, comprising: ethylene-α-olefin-nonconjugated polyene copolymer in an amount of 100 phr; carbon black in an amount ranging from more than 50 to 120 phr, the carbon black having an arithmetic average particle diameter of not smaller than 60 nm; a softener in an amount of not more than 100 phr; and thermo-expansive capsules in an amount ranging from 1 to 10 phr.

Another aspect of the present invention resides in a polymer-extruded article produced by extrusion and vulcanization of a polymeric composition including ethylene-α-olefin-nonconjugated polyene copolymer in an amount of 100 phr; carbon black in an amount ranging from more than 50 to 120 phr, the carbon black having an arithmetic average particle diameter of not smaller than 60 nm; a softener in an amount of not more than 100 phr; and thermo-expansive capsules in an amount ranging from 1 to 10 phr. The polymer-extruded article comprises a surface section having an uneven surface derived from thermal expansion of the thermo-expansive capsules, and a rough surface derived from carbon particle of the carbon black and formed at the uneven surface derived form the thermal expansion of the thermo-expansive capsules.

A further aspect of the present invention resides in a weather strip for an automotive vehicle, produced by extrusion and vulcanization of a polymeric composition including ethylene-α-olefin-nonconjugated polyene copolymer in an amount of 100 phr; carbon black in an amount ranging from more than 50 to 120 phr, the carbon black having an arithmetic average particle diameter of not smaller than 60 nm; a softener in an amount of not more than 100 phr; and thermo-expansive capsules in an amount ranging from 1 to 10 phr. The weather strip comprises a surface section having an uneven surface derived from thermal expansion of the thermo-expansive capsules, and a rough surface derived from carbon particle of the carbon black and formed at the uneven surface derived from the thermal expansion of the thermo-expansive capsules.

According to the present invention, the polymeric composition contains at least ethylene-α-olefin-nonconjugated polyene copolymer in an amount of 100 phr, carbon black in an amount ranging from more than 50 phr to 120 phr, the carbon black having an arithmetic average particle diameter of not smaller than 60 nm, a softener in an amount of not more than 100 phr, and thermally expandable micro-capsule in an amount ranging from 1 phr to 10 phr, upon being blended. Accordingly, a surface treatment agent or the like is not coated, and therefore it is unnecessary to take account of its coating conditions and the like.

In the polymer-extruded article produced by extrusion and valcanization of the above-mentioned polymeric composition, the above-mentioned thermally expandable micro-capsule expands during valcanization, and therefore an uneven surface derived from thermal expansion of the thermo-expansive capsules are formed, the uneven surface having a shape according to the blending amount and a thermal expansion degree of the thermo-expansive capsules. Additionally, since the carbon black having an arithmetic average particle diameter of not smaller than 60 nm is blended in an amount ranging from more than 50 phr to 120 phr, a part containing a large amount of ethylene-α-olefin-nonconjugated polyene copolymer is locally formed in the above-mentioned polymer-extruded article. Shrinkage or the like occurs at the part, and therefore the rough surface derived from the carbon particles of the carbon black is formed at the above-mentioned uneven surface derived from the thermal expansion of the thermo-expansive capsules, the rough surface having a surface roughness according to the particle diameter, blending amount and the like of the carbon black. With this, the contact area between the above-mentioned polymer-extruded article and the object to be used is made small.

The respective blending amounts of the above-mentioned ethylene-α-olefin-nonconjugated polyene copolymer, carbon black, softener and thermally expandable micro-capsule are preferably respectively within ranges which can degrade the characteristics of the intended polymeric composition and the polymer-extruded article.

For example, with the blending amounts of the above-mentioned ethylene-α-olefin-nonconjugated polyene copolymer, carbon black, softener and thermally expandable micro-capsule respectively outside the ranges of the present invention, it may be possible that the workability of the polymeric composition and the characteristics (sliding characteristics, adherence resistance, water repellency and the like) of the polymer-extruded article be degraded.

In case that the above-mentioned silicone compound is excessively blended, it may be possible that it become difficult to weld the above-mentioned polymer-extruded article to the object to be used (for example, welding to a thermoplastic elastomer, or welding during injection molding together with a rubber member).

In addition to the above-mentioned various materials, a variety of additional materials treated in the technical field of polymer-extruded article produced by general extrusion and valcanization may be blended. It is preferable that the respective blending amounts of the blended additional materials are within ranges which do not degrade the intended characteristics of the polymeric composition and the polymer-extruded article.

For example, in case of using a vulcanizing agent, a valcanization accelerator, a valcanization-accelerating assistant, and the like, if the blending amounts of them are too little, valcanization progress becomes slow; whereas if the blending amount is too much, it may be possible to raise a bloom phenomena.

BRIEF DESCRIPTION OF THE DRAWINGS

In the drawings, like reference numerals designate like parts and elements throughout all figures.

DETAILED DESCRIPTION OF THE INVENTION

Hereinafter, discussion will be made in detail on a polymeric composition, a polymer-extruded article, and a weather strip for an automotive vehicle, as embodiments of the present invention, with reference to drawings or the like.

According to the present invention, a polymeric composition used for a polymer-extruded article produced by extrusion and valcanization comprises, upon blending, ethylene-α-olefin-nonconjugated polyene copolymer in an amount of 100 phr (parts per hundred parts of rubber); carbon black in an amount ranging from more than 50 to 120 phr, the carbon black having an arithmetic average particle diameter of not smaller than 60 nm; a softener in an amount of not more than 100 phr; and thermo-expansive capsules in an amount ranging from 1 to 10 phr.

The polymer-extruded article is obtained by blending a polymer material such as a rubber material (for example, ethylene-α-olefin-nonconjugated polyene copolymer) and the like and by extrusion and vulcanization of the polymer material. More specifically, at least the above-mentioned polymer material, carbon black, a softener and thermo-expansive capsules are blended respectively in specified amounts. As the above-mentioned carbon black, carbon black having a relatively large particle diameter is used in a small amount which is less than an amount (for example, not less than 140 phr) treated in the technical field of polymer-extruded article by general extrusion and valcanization, on the basis of using 100 phr of the rubber material.

The polymeric composition of the present invention contains the ethylene-α-olefin-nonconjugated polyene copolymer in a blending amount of 100 phr. The blending amount means an amount of a component to be contained in the polymeric composition under blending. Regarding other components than the ethylene-α-olefin-nonconjugated polyene copolymer, the blending amount of them is an amount contained in the polymeric composition, based on 100 phr of the ethylene-α-olefin-nonconjugated polyene copolymer.

Figure 1A:
FIG. 1A to 1E are sectional explanatory views which respectively show structural models of polymer formed bodies produced by extrusion and valcanization of polymeric compositions.

In general extrusion and valcanization, after a polymeric composition is discharged from a die of an extruder, a discharged body (extruded material) is put into a free condition (i.e., a condition where a pressure is hardly applied to the discharged body, different from that in molding using a mold) where cross-linking reaction is made thereby obtaining an intended polymer-extruded article. Accordingly, for example, in case that carbon black having an average particle diameter smaller than 60 nm is blended to ethylene-α-olefin-nonconjugated polyene copolymer so as to form a polymeric composition, or in case that carbon black having an average particle diameter of not smaller than 60 nm is mixed in an amount more than 120 phr to the copolymer (100 phr) so as to form a polymeric composition, a polymer-extruded article produced as a general polymer-extruded article by extrusion and valcanization of the above polymeric composition becomes one shown in the structural model figure of FIG. 1A in which the surface of the polymer-extruded article (indicated by the numeral 10 in FIG. 1) is relatively flat.

Figure 1B:
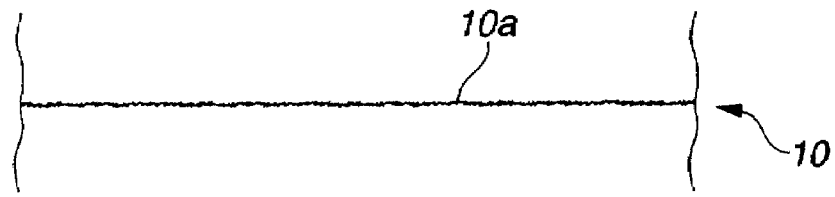
Figure 1C:
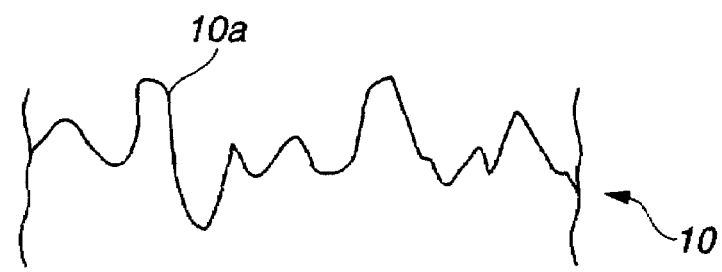

Additionally, in case that carbon black having an average particle diameter of not smaller than 60 nm is blended in an amount of not more than 120 phr to the above-mentioned ethylene-α-olefin-nonconjugated polyene copolymer so as to form a polymeric composition which is extruded and vulcanized to obtain a polymer-extruded article, a rough surface which has a small surface roughness and is derived from carbon particle of the carbon black is formed at the surface of the polymer-extruded article as shown in structural model figures of FIG. 1B and FIG. 1C (a partly enlarged view of FIG. 1B). This seems to be caused by the fact that the blending amount of carbon black having large particle diameter is relatively little, and therefore a part containing a large amount of ethylene-α-olefin-nonconjugated polyene copolymer is locally formed in the above-mentioned polymer-extruded article, shrinkage or the like tending to occur at the part.

Figure 1D:
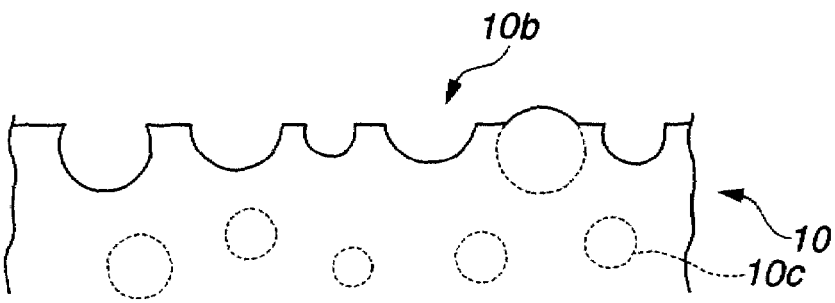

Here, in case of a polymer-extruded article which is obtained by extrusion and valcanization of a polymeric composition prepared by mixing thermally expandable microcapsule described in the column of the Background of the Invention to the above-mentioned ethylene-α-olefin-nonconjugated polyene copolymer, an uneven surface 10b derived from thermal expansion of the thermo-expansive capsules are formed at the surface of the polymer-extruded article as shown in the structural model figure of FIG. 1D in which the uneven surface is formed in a shape which is obtained under breakage and burning-down of the outer shell wall (discussed in detail after) of a polymer-extruded article of the thermo-expansive capsules 10c. In case of a polymer-extruded article which is obtained by extrusion and valcanization of a polymeric composition prepared by mixing an organic foaming agent or the like in place of the above-mentioned thermo-expansive capsules, first a coating film is formed at the surface of the polymer-extruded article so that the surface of the coating film becomes highly rough. However, it is to be noted that the surface formed merely highly rough cannot attain a good sliding characteristics and a good adhesion resistance as objects of the present invention.

Figure 1E:
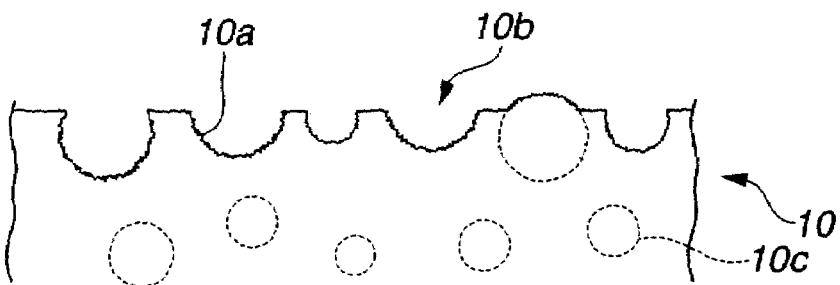

In case that carbon black having an average particle diameter of not smaller than 60 nm is blended in an amount of not more than 120 phr to the above-mentioned ethylene-α-olefin-nonconjugated polyene copolymer (100 phr) while a thermo-expansive capsules are blended to the coplymer (100 phr) thereby to prepare a polymeric composition which is to be extruded and vulcanized to form a polymer-extruded article, an uneven surface 10b derived from thermal expansion of the thermo-expansive capsules are formed at the surface of the polymer-extruded article as shown in the structural model figure of FIG. 1E, while a rough surface derived from carbon particle of the carbon black is formed at the uneven surface 10b.

In the polymeric composition and the polymer-extruded article made of the polymeric composition, according to the embodiment of the present invention, not only ethylene-α-olefin-nonconjugated polyene copolymer, carbon black, softener and thermo-expansive capsules but also various additives such as foaming agent, silicone compound, vulcanizing agent, vulcanization accelerator, valcanization-accelerating assistant, processing aid, inorganic filler and the like may be suitably blended according to application purposes.

[Ethylene-α-olefin-nonconjugated Polyene Copolymer]

Examples of α-olefin of the ethylene-α-olefin-nonconjugated polyene copolymer are propylene, 1-butene, 1-pentene, 1-hexene, 4-methyl-1-pentene, 1-octene, 1-octene and the like. Propylene is preferable. It is the matter of course that a plurality of ones may be selected from the above-mentioned group of α-olefin, in which, for example, propylene and 1-butene are used in combination.

Examples of nonconjugated polyene are cyclic nonconjugated polyenes such as 5-ethylidene-2-norbornene, dicyclopendadiene, 5-vinyl-2-norbornene, norbornadiene, methyltetrahydroindene and the like; and chain nonconjugated polyenes such as 1,4-hexadiene, 7-methy-1,6-octadiene, 4-ethylidene-8-methyl-1,7-nonadiene, 4-ethylidene-1,7-undecadiene, 4,8-dimethyl-1,4,8-decatriene, and the like. Of these nonconjugated polyenes, a single one may be used or two or more ones are used in combination, in which a content ratio of the nonconjugated polyene in the ethylene-α-olefin-nonconjugated polyene copolymer is, for example, in a range of from 1 wt % to 20 wt %, preferably in a range of from 1 wt % to 15 wt %, more preferably in a range of from 5 wt % to 11 wt %. As such ethylene-α-olefin-nonconjugated polyene copolymer, for example, Keltan 7341A (trade name) produced by DSM●Elastomers can be used.

[Carbon Black]

The above-mentioned carbon black is one used, for example, in the technical field of polymer-extruded article and having an average particle diameter (arithmetic average particle diameter) of not smaller than 60 nm, preferably within a range of from 70 nm to 90 nm. Regarding a blending amount of this carbon black, if it is not more than 50 phr, a kneading processing becomes difficult. Therefore, the blending amount of the carbon black is within a range of from more than 50 phr to not more than 120 phr, preferably within a range of from not less than 60 phr to not more than 120 phr. As such carbon black, for example, a lot having an arithmetic average particle diameter of not smaller than 60 nm is selected from Asahi carbon black●Asahi #50 (trade name) or Asahi carbon black●Asahi #55 (trade name) produced by Asahi Carbon Co., Ltd. to be used.

[Thermo-expansive Capsules]

Example of the above-mentioned thermo-expansive capsules is liquid-filled thermoplastic resin particles (thermally expandable thermoplastic resin particles) each of which has a thermoplastic shell wall (for example, a spherical shell wall) filled with a liquid (for example, hydrocarbon or chlorinated hydrocarbon having a low boiling point) which generates gas upon heating. The liquid-filled thermoplastic resin particle has a true specific gravity of not more than 0.1, a particle diameter (median diameter) ranging from 5 µm to 100 µm, and is expandable upon heating (for example, heating at the temperature of valcanization) at a temperature of not lower than an expansion initiating temperature (for example, 100° C. to 200° C.) of the liquid, so that a thermally expanded cell having a diameter, for example, of 30 µm to 300 µm is formed in the intended polymer-extruded article.

Examples of the component of the thermoplastic resin constituting the shell wall of the above-mentioned thermo-expansive capsule is preferably (meth) acrylic nitrile polymer, and a polymer containing much (meth) acrylic nitrile. Examples of monomer (opposite monomer or co-monomer) for the above acrylic nitrile in the polymer are monomers such as vinyl halide, vinylidene halide, stylene-based monomer, (meth) acrylate-based monomer, vinyl acetate, butadiene, vinyl pyridine, chloroprene, and the like.

The above-mentioned shell wall is preferably formed of a thermoplastic resin which is not cross-linked or may be formed of a thermoplastic resin which is cross-linked with a cross-linking agent such as generally used divinylbenzene, ethylene glycol di(meth)acrylate, and the like. Additionally, examples of the liquid filled inside the shell wall of the thermo-expansive capsules are hydrocarbons such as n-pentane, isopentane, neopentane, butane, isobutene, hexane, petroleum ether, and the like; and chlorinated hydrocarbons such as methyl chloride, dichloroethylene, trichloroethane, trichloroethylene and the like.

As the thermo-expansive capsules, Daifoam H750D, H770D, H850D and M430 in the same series produced by Dainichiseika Color & Chemicals Mfg. Co., Ltd. are suitably used. Additionally, for example, Matsumoto Microsphere F85D and F100D produced by Matsumoto Yushi-Seiyaku Co., Ltd., and Expancel 091DU-80, 092DU-120 and the like produced by Expancel in Sweden are used as the thermo-expansive capsules. The blending amount of the thermo-expansive capsules are within a range of from 1.0 phr to 10 phr, preferably within a range of from 2 phr to 6 phr.

When such thermo-expansive capsules are added to the polymer material such as the ethylene-α-olefin-nonconjugated polyene copolymer, the thermo-expansive capsules may be previously mixed with other using materials (for example, one or more of polymer elastomer, thermoplastic resin, softener, inorganic filler, and the like) and added to the polymer material in order to prevent scattering of and improve dispersion of the thermo-expansive capsules. In case that the thermo-expansive capsules are previously mixed with other using materials to be added to the polymer material, the mixing ratio of the foaming agent is adjusted to be within a range of from 10 wt % to 99 wt %, preferably within a range of from 10 wt % to 50 wt %, based on the thermo-expansive capsules. Additionally, one of the above-mentioned thermo-expansive capsuless may be used, or a plurality of the above-mentioned thermo-expansive capsuless may be used in combination.

[Softener]

Examples of the above-mentioned softener are petroleum-based softeners such as process oil, paraffin-based oil, lubricating oil, liquid paraffin, petroleum asphalt, vaseline and the like; coal tar-based softeners such as coal tar, coal tar pitch and the like; and fat-based softeners such as castor oil, linseed oil, rapeseed oil, coconut oil and the like. Of these softeners, the petroleum-based softeners are preferable, and the paraffin-based oil is more preferable. The softeners mentioned above are used in such a blending amount as not to degrade the intended characteristics of the polymeric composition and polymer-extruded article, for example, in an amount of not more than 100 phr.

[Forming Agent]

Examples of the above-mentioned foaming agent are 4,4-oxybisbenzenesulphonylhydrazide (OBSH), azodicarbon-amide (ADCA), dinitrosopentamethylenetetramine (DPT), azobisisobutyronitrile (AIBN), paratoluenesulphonylhydrazide (TSH), hydrazodicarbonamide (HDCA), bariumazocarboxylate, and the like.

The above-mentioned foaming agent is used in such an mount as not to degrade the characteristics of the intended polymeric composition and polymer-extruded article (for example, in an amount of 0 to 10 phr). Additionally, foaming assistance such as urea-based derivatives, salicylic acid, phthalic acid, stearic acid, and/or the like may be used together with the above-mentioned foaming agent.

[Silicone Compound]

Examples of the above-mentioned silicone compound are silicone gel-based compound, silicone oil-based compound, silicone powder-based compound, silicone containing polymer-based compound, silicone graft polymer-based compound, silicone containing organic resin, and the like. The silicone compound is, for example, KE76BS, KF99 and KF96 produced by Shin-Etsu Chemical Co., Ltd; and E500, E600, BY27 series (preferably BY27-001, BY27-002, BY27-201, BY27-201C, BY27-202, SP-300 and SP-310) produced by Dow Corning Toray Silicone Co., Ltd., and the like. Additionally, other silicone compounds generally available are also suitably used as the silicone compound of the present invention.

The above-mentioned silicone compound is used in such a blending amount as not to degrade the characteristics of the intended polymeric composition and polymer-extruded article (for example, in a blending amount of 0 to 30 phr). Additionally, any one of the above-mentioned silicone compounds may be used, or a plurality of the above-mentioned silicone compounds may be used in combination.

[Vulcanizing Agent]

Example of the above-mentioned vulcanizing agent is sulfur which is used in such a blending amount as not to degrade the characteristics of the intended polymeric composition and polymer-extruded article, preferably in an amount ranging from 0.5 phr to about 2 phr.

[Valcanization Accelerator]

Examples of the above-mentioned valcanization accelerator are thiazole-based assistant, thiuram-based assistant, sulfenamide-based assistant, guanidine-based assistant, thio-urea-based assistant, and dithiocarbamic acid-based assistant. The valcanization accelerator is used in such a blending amount as not to degrade the characteristics of the intended polymeric composition and polymer-extruded article, preferably in a blending amount ranging from about 2 phr to 8 phr.

[Valcanization-accelerating Assistant]

Examples of the above-mentioned valcanization-accelerating assistant are zinc oxide (zinc white), zinc carbonate, magnesium oxide, calcium hydroxide, zinc monoxide, and the like, in which zinc oxide and/or magnesium oxide are preferable. The valcanization-accelerating assistant is used in such a blending amount as not to degrade the characteristics of the intended polymeric composition and polymer-extruded article, preferably in a blending amount of about 5 phr.

[Processing Aid]

Examples of the above-mentioned processing aid are higher fatty acids such as stearic acid, ricinolic acid, palmitic acid, lauric acid, and the like; esters of the higher fatty acids; and salts of the higher fatty acids such as stearic acid and the like. Other compounds treated as processing aids in the technical field of polymer-extruded article may be used as the processing aid of the present invention. The processing aid is used in such a blending amount as not to degrade the characteristics of the intended polymeric composition and polymer-extruded article, preferably in an amount of about 5 phr, more preferably in an amount of not more than 3 phr.

[Inorganic Filler]

Examples of the above-mentioned inorganic filler are calcium carbonate, clay, silica, calcium silicate, magnesium carbonate, magnesium hydroxide, aluminium oxide, kaolin, mica, zeolite, and the like. Any one of these fillers may be used, or a plurality of these fillers may be used in combination. Additionally, the above inorganic filler(s) is used in such a blending amount as not to degrade the characteristics of the intended polymeric composition and polymer-extruded article, for example, in a blending amount ranging from about 0 to 100 phr.

[Other Additives]

Examples of other additives than the above-mentioned various additives are dehydrating agent, antioxidant, age resistor, heat stabilizer, light stabilizer, ultraviolet ray absorbent, neutralizer, lubricant, defogging agent, antiblocking agent, slipping agent, dispersant, flame retardant, antistatic agent, conductivity providing agent, tackifier, cross linking agent, cross linking assistant, metal deactivator, molecular weight modifier, fungus and mildew-proof agent, fluorescent whitening agent, slidability improver, coloring agent (titanium oxide and the like), metal powder (ferrite and the like), glass fiber, inorganic fiber (metal fiber and the like), carbon fiber, organic fiber (Aramid fiber and the like), composite fiber, glass balloon, glass flake, graphite, carbon nanotubes, fullerene, barium sulfate, fluororesin, filler polyoleffin wax (polymer bead and the like), cellulose powder, rubber powder, regenerated rubber, and the like. Any one of the above additives may be used, or a plurality of the above additives may be used in combination. The above additives are suitably used according to the intended polymeric composition and polymer-extruded article.

[Producing Method]

In order to obtain the intended polymeric composition by kneading the above-mentioned ethylene-α-olefin-nonconjugated polyene copolymer, carbon black, softener, thermo-expansive capsules, various additives and the like, for example, various closed-type kneaders such as a tangential mixer, an engaging-type mixer, a kneader or the like; kneading-type biaxial extruder; or an open roll; and the like are suitably used. Additionally, in order to obtain the intended polymer-extruded article by extruding and vulcanizing the above-mentioned polymeric composition, for example, a continuous hot-air valcanization (HAV) vessel, a ultra high frequency valcanization (UHF) apparatus, a horizontal fluid bed continuous valcanization (HFB) apparatus or the like can be suitably used. Preferably, the continuous hot-air valcanization vessel and the ultra high frequency valcanization apparatus are used in combination.

EXAMPLES

The present invention will be more readily understood with reference to the following Examples in comparison with Comparative Examples; however, these Examples are intended to illustrate the invention and are not to be construed to limit the scope of the invention.

A variety of polymeric compositions (rubber compounds S1 to S13 ("Examples") and rubber compounds P1 to P11 ("Comparative Example")) were produced according to the embodiments of the present invention, upon which a workability of their polymeric compositions, physical properties of polymer formed bodies and the like were inspected using specimens GS1 to GS13 ("Examples") and specimens GP1 to GP11 ("Comparative Example").

In order to produce each polymeric composition, first, ethylene-propylene-5-ethylidene-2-norbornene (Keltan 7341A (trade name) produced by DSM●Elastomers) was used in an amount of 100 phr as the polymer material and masticated in a closed-type mixer thereby obtaining a masticated polymer material. Thereafter, to the masticated polymer material, one or more kinds of carbon blacks having respective arithmetic average particle diameters 80 nm, 60 nm and 45 nm (respectively referred hereinafter to as "carbon black 80 nm", "carbon black 60 nm", and "carbon black 45 nm") in an amount within a range of from 50 phr to 140 phr, a softener (process oil P-300 produced by Japan Energy Corporation (JOMO)) in an amount ranging from 80 phr to 20 phr, and a silicone compound (BY27-002 produced by Dow Corning Toray Silicone Co., Ltd.) in an amount ranging from 0 to 40 phr were added, upon which kneading was made for a specified time thereby obtaining a kneaded polymer material.

In the Examples and Comparative Examples, the above-mentioned carbon black 80 nm, carbon black 60 nm and carbon black 45 nm were used by selecting carbon blacks having the respective arithmetic average particle diameters of 80 nm, 60 nm and 45 nm from the respective material lots of Asahi carbon black●Asahi #50, Asahi carbon black●Asahi #55, and Asahi carbon black●Asahi #60 produced by Asahi Carbon Co., Ltd. Additionally, in addition to the above-mentioned various materials, stearic acid and/or polyethylene glycol in a blending amount of 1 phr as processing aid, calcium carbonate in an amount of 30 phr as inorganic filler, and active zinc white in a blending amount of 3 phr as valcanization-accelerating assistant were added to the above-mentioned kneaded polymer material, upon which kneading was made for a specified time thereby obtaining a further kneaded polymer material.

Thereafter, the above-mentioned further kneaded polymer material formed by the closed-type mixer was taken out. Then, to the taken-out kneaded polymer material, thermo-expansive capsules (Daifoam H750D produced by Dainichiseika Color & Chemicals Mfg. Co., Ltd) in an amount ranging from 0 to 20 phr, 4,4-oxybisbenzenesulphonylhydrazide-based foaming agent in a blending amount ranging from 0 to 3.5 phr were added upon the kneaded polymer material being wound on a roll while kneading was being made by an open mill, and then mixing or blending was made for a specified time. As a result, the rubber compounds S1 to S13 and P1 to P11 having a variety of compositions shown in Table 1 described below were obtained, in which the rubber compounds were ribbon-shaped or sheet-shaped and were unvulcanized rubber compounds.

Additionally, in the Examples and Comparative Examples, in addition to the above-mentioned various materials, sulfur in a blending amount of 1 phr as the vulcanizing agent, thiuram-based, thiazole-based, sulfenamide-based and dithiocarbamic acid-based valcanization accelerators were added in a total blending amount of 5 phr, and then mixing was made for a specified time.

Figure 2:
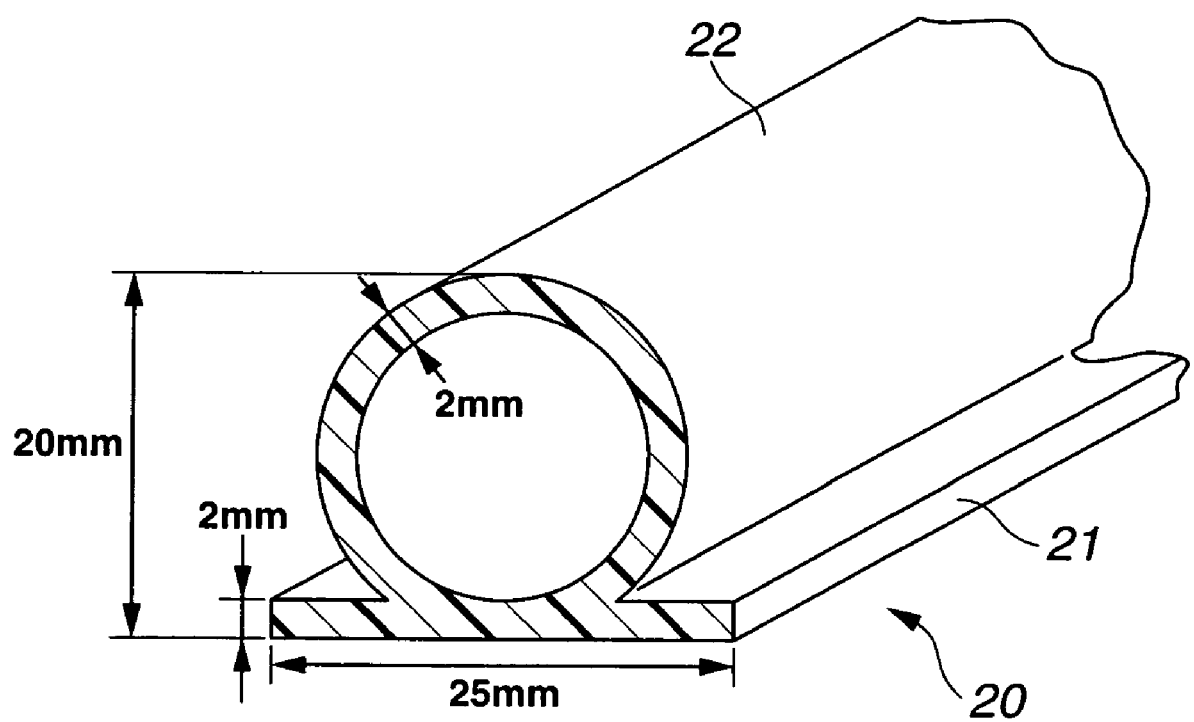
FIG. 2 is a schematic fragmentary perspective view of a specimen of the polymer-extruded article used as each of Examples and Comparative Examples.

Next, each of the above-mentioned rubber compounds was extruded by using an extruder for polymer-extruded article, in which the extruder had such a mouthpiece shape as to obtain a polymer-extruded article shown in FIG. 2 as described after so as to make an extrusion upon adjusting a screw rotational speed thereof thereby forming an extruded formed body. Thereafter, the extruded formed body was vulcanized in the continuous hot-air valcanization vessel, in which vulcanization was made at a temperature of 200° C. for a time of 10 minutes, thereby producing a specimen GS1 to GS13, GP1 to GP11 (indicated by the reference numeral 20 in FIG. 2) of a polymer-extruded article (having a height of 20 mm) as shown in FIG. 2. The specimen had a generally flat plate-shaped base section 21 (having a thickness of 2 mm and a width of 25 mm) provided with a tube section (or a tube having a thickness of 2 mm) which was circular in transverse cross section.

The surface of the above-mentioned specimen GP4 or GP5 was coated with a surface treatment agent which had been prepared by blending urethane polyol in an amount of 85 phr, polyisocyanate in an amount of 15 phr, diorganosiloxane in an amount of 40 phr, a curable silicone oil in an amount of 40 phr, a catalyst in an amount of 4 phr, a delustering agent in an amount of 15 phr and a solvent in an amount of 1500 phr, thereby forming a surface treatment coating.

set at 5 mm. In the column of the kneading workability in FIG. 2 described after, a character "A" indicates a case that the rubber compound easily penetrated between the rolls and would on the rolls in such a manner as to be in tight contact with the rolls; a character "C" indicates a case that the rubber compound could not come into tight contact with each roll so as to hang down or cut out in the middle of the rubber compound; and a character "B" indicates a case that the rubber compound was difficult to penetrate between the rolls but wound on the rolls with lapse of time.

[Extrusion Formability]

Each of the above-mentioned rubber compounds (or rubber compounds whose temperature was adjusted at 60±5° C. corresponding to the temperature at extrusion) was extruded for 1 minute by using an extruder whose rotational speed was set at 15 r.p.m., provided with an extruding device having a diameter of 75 mm, thereby obtaining a polymer-extruded article (indicated by the reference numeral 20) of the shape shown in FIG. 2.

This extrusion was repeated 100 times for each rubber compound, in which the mass (g) of the extruded formed body (unvulcanized formed body) discharged from the extruder at each extrusion was weighed as a discharge

TABLE 1

| | | Rubber compound | | | | | | | | | | | | |
|---|---|---|---|---|---|---|---|---|---|---|---|---|---|---|
| | | S1 | S2 | S3 | S4 | S5 | S6 | S7 | S8 | S9 | S10 | S11 | S12 | S13 |
| Main Components | Carbon 80 nm | 60 | 100 | 120 | 100 | 100 | 100 | 100 | 100 | — | 100 | 120 | 100 | 100 |
| | Carbon 60 nm | — | — | — | — | — | — | — | — | 100 | — | — | — | — |
| | Carbon 45 nm | — | — | — | — | — | — | — | — | — | — | — | — | — |
| | Softener | 80 | 80 | 80 | 100 | 80 | 80 | 80 | 80 | 80 | 80 | 100 | 80 | 80 |
| | Thermally expandable capsule | 2 | 2 | 2 | 2 | 6 | 10 | 2 | 2 | 2 | 2 | 2 | 6 | 2 |
| | Silicone compound | 20 | 20 | 20 | 20 | 20 | 20 | 2 | 10 | 20 | — | — | 20 | 40 |
| | Organic foaming agent | 3.5 | 3.5 | 3.5 | 3.5 | 3.5 | 3.5 | 3.5 | 3.5 | 3.5 | 3.5 | 3.5 | — | 3.5 |

| | | Rubber compound | | | | | | | | | | |
|---|---|---|---|---|---|---|---|---|---|---|---|---|
| | | P1 | P2 | P3 | P4 | P5 | P6 | P7 | P8 | P9 | P10 | P11 |
| Main Components | Carbon 80 nm | 140 | 100 | 100 | 140 | 140 | 140 | 50 | 120 | 100 | — | — |
| | Carbon 60 nm | — | — | — | — | — | — | — | — | — | — | 140 |
| | Carbon 45 nm | — | — | — | — | — | — | — | — | — | 100 | — |
| | Softener | 110 | 80 | 80 | 110 | 110 | 80 | 80 | 120 | 80 | 80 | 80 |
| | Thermally expandable capsule | — | — | — | — | — | 2 | 2 | 2 | 20 | 2 | 2 |
| | Silicone compound | — | — | 20 | — | — | 20 | 20 | 20 | 20 | — | — |
| | Organic foaming agent | 3.5 | 3.5 | 3.5 | 3.5 | 3.5 | 3.5 | 3.5 | 3.5 | 3.5 | 3.5 | 3.5 |

(Unit: phr)

Workability (kneading workability and extrusion formability) of each rubber compound produced as discussed above, and a surface condition (surface roughness), an adhesion resistance (adhesion force), a sliding characteristics (friction coefficient) and a water repellency (contact angle of water) of each specimen were measured under test methods discussed below, upon which measurement results are shown in Table 2 described after. Characters "A", "B" and "C" in the column of Total Evaluation in Table 2 represent respectively a case of being able to be well applied to a weather strip or the like for an automotive vehicle, a case of being able to be sufficiently applied to the weather strip or the like, and a case of being difficult to be applied to the weather strip or the like.

[Kneading Workability]

Each of the above-mentioned rubber compounds was kneaded by an open roll apparatus including rolls each having a diameter of 14 inch, the distance between the rollers being amount. The maximum value, the minimum valve and an average value of the discharge amounts were respectively referred to as the maximum discharge amount, the minimum discharge amount and an average discharge amount. Then, dispersion of the discharge amounts was calculated for each rubber compound, according to an equation (1) shown below.

Dispersion of the discharge amounts (%)=(([the maximum discharge amount]−[the minimum discharge amount])/the average discharge amount)×100     (1)

[Surface Roughness]

The above-mentioned specimen (polymer-extruded article) 20 was punched out to form a rectangular and flat plate-shaped test piece (having a dimension of 5mm ×100mm×2mm). After contamination on the surface of the test piece was wiped out with alcohol, a surface roughness (or a ten-point average roughness) of the test piece was measured according to a so-called ten point method (or a method according to JIS B 0601 1982) by using a surface roughness meter (Surfcorder SE30D produced by Kosaka Laboratory Ltd.). As the contact needles of the above-mentioned roughness meter, a contact needle having a tip end radius of 2μm (for a rough surface derived from the carbon particles of the carbon black) and a contact needle having a tip end radius of 250μm (for an uneven surface derived from thermal expansion of the thermo-expansive capsules) were used to measure respectively the surface roughness of the rough surface derived from the carbon particles of the carbon black and the uneven surface derived from thermal expansion of the thermo-expansive capsules.

[Adherence Resistance]

Figure 3A:
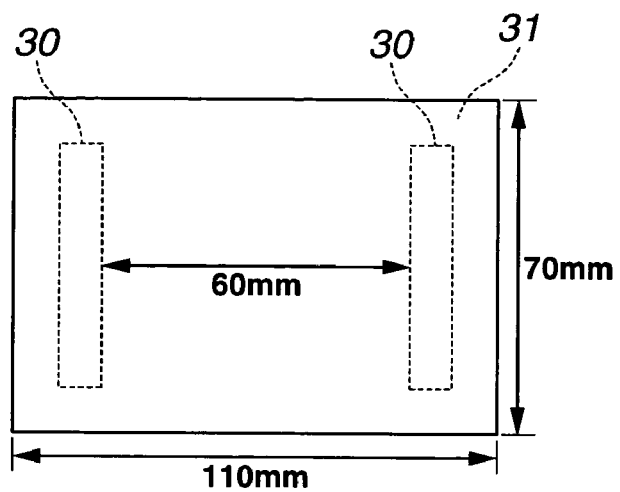
FIG. 3A to 3C are respectively explanatory plan, side and operational perspective views showing a measuring method for an adherence resistance of a test piece of each of Examples and Comparative Examples.
Figure 3B:
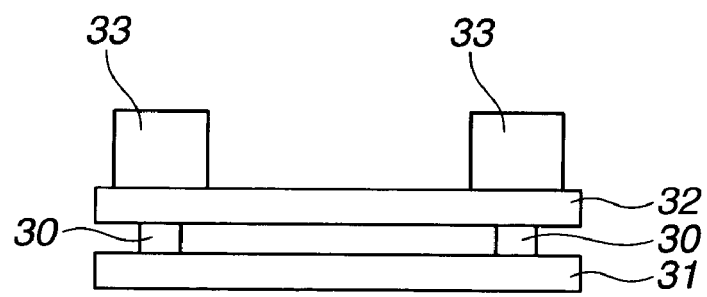
Figure 3C:
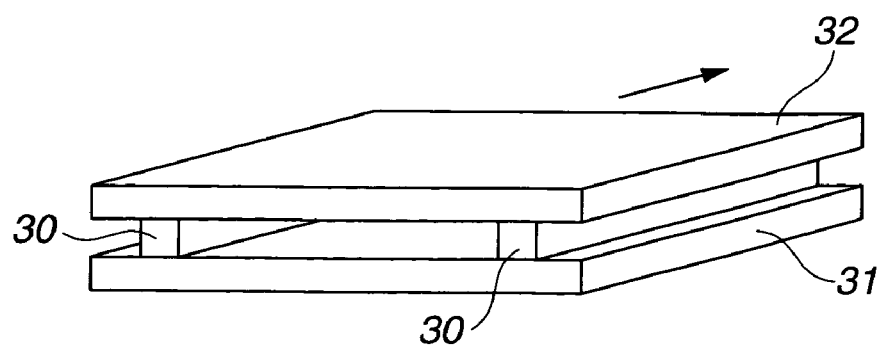

As shown in FIGS. 3A (plan view), 3B (side view) and 3C (operational perspective view), the above-mentioned specimen 20 was punched out to form two rectangular flat plate-shaped test pieces 30 (having a dimension of 5 mm×50 mm×2 mm). After contamination on the surface of each test piece was wiped out with alcohol, the test pieces were fixed to a rectangular and flat plate-shaped stainless steel plate 31 spacing 60 mm from each other, with an adhesive double coated tape and an adhesive, in which fixing of the test piece was accomplished at a surface (having a dimension of 5 mm×50 mm) of the test piece.

Additionally, a coated plate 32 (a steel plate coated with white color melamine resin coating) for an automotive vehicle was put on the test pieces 30 in such a manner as to cover the above-mentioned both test pieces 30, in which the coated plate was rectangular and flat plate-shaped (having a shape similar to that of the stainless steel plate 31 and had a thickness of 1.0 mm to 1.5 mm). Then, two weight members 33 were put on the coated plate 32 and allowed to stand in a thermostatic oven (i.e., in an atmosphere of a temperature of 80° C.), applying a load of 49N (24.5N×2) at portions of the coated plate which portions corresponding to the positions of the test pieces 30.

Then, the above-mentioned weight members 33 were removed (immediately before measurement), and the above-mentioned coated plate 32 was pulled at a rate of 50 mm/minute in a horizontal direction (i.e., longitudinal direction of each test piece 30, or in a direction indicted by an arrow), in which the maximum load (unit: N/5 cm$^2$) generated when the coated plate 32 and the test pieces 30 were completely peeled off from each other was measured as an adhesion force. The above unit N/5 cm$^2$ used here was a unit specified by the inventors for the purpose of numerically representing a peeling-off load relative to the total contacting areas of the two test pieces 30.

[Friction Coefficient]

Figure 4:
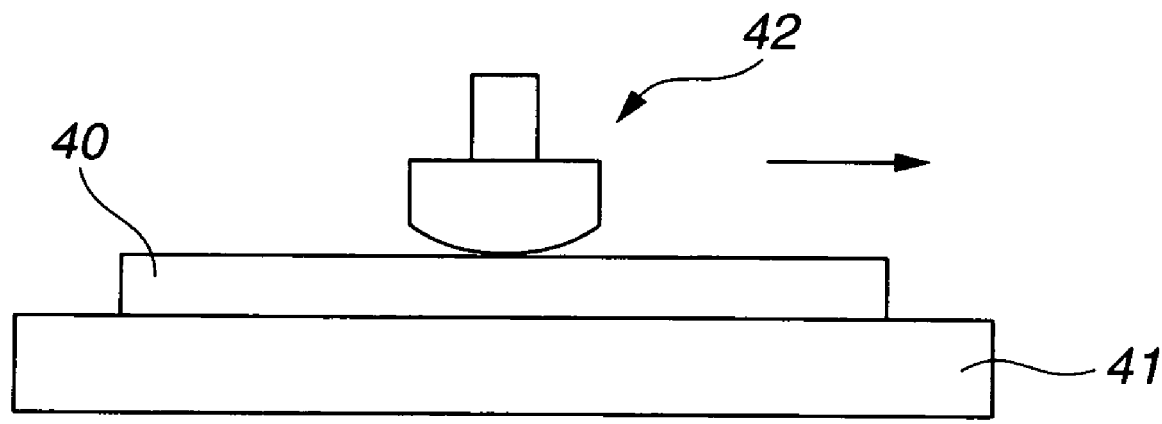
FIG. 4 is an explanatory side view showing a measuring method for a friction coefficient of a test piece of each of Examples and Comparative Examples.

As shown in FIG. 4, the above-mentioned specimen (polymer-extruded article) 20 was punched out to form a rectangular and flat plate-shaped test piece 40 (having a dimension of 5 mm×100 mm×2 mm). After contamination on the surface of the test piece 40 was wiped out with alcohol, the test piece 40 was put on a support table (test table) 41. Then, a weight member 42 formed with a glass spherical surface having a radius of 50 mm in section was mounted on the test piece 40, in which the side of the spherical surface having the radius of 50 mm in section was contacted with the test piece 40. Then, the weight member 42 was slidingly moved in a horizontal direction (i.e., in a longitudinal direction of the test piece 40, or in a direction indicated by an arrow) at a rate of 1000 mm/minute in such a manner that the sliding movement of the weight member was made while the weight member was contacting with the test piece 40, thereby measuring a static friction coefficient (μs) and a dynamic friction coefficient (μd).

[Contact Angle of Water]

Figure 5:
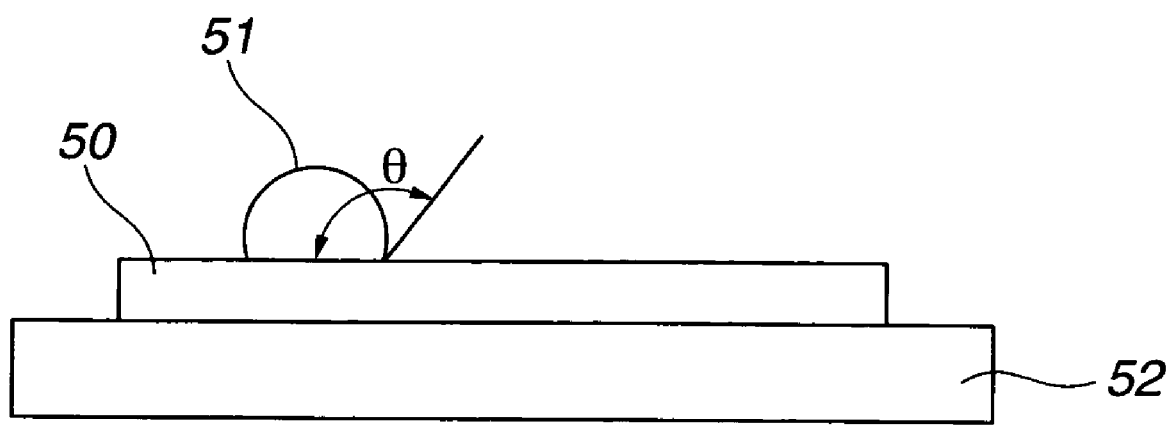
FIG. 5 is an explanatory side view showing a measuring method for a contact angle of water of a test piece of each of Examples and Comparative Examples.

As shown in FIG. 5, the above-mentioned specimen (polymer-extruded article) 20 was punched out to form a rectangular and flat plate-shaped test piece 50 (having a dimension of 5 mm×100 mm×2 mm). After contamination on the surface of the test piece 50 was wiped out with alcohol, the test piece 40 was put on a horizontal support table 52. Water in an amount of 1.5 ml was dropped on the surface of the test piece 50, and the dropped water was allowed to stand for 10 seconds. Then, a contact angle θ between the dropped water drop and the test piece 50 was measured by a contact angle meter (Face●Contact-Angle Meter CA-D type produced by Kyowa Interface Co., Ltd.).

TABLE 2

| | | Target | Specimen | | | | | | | |
| --- | --- | --- | --- | --- | --- | --- | --- | --- | --- | --- |
| | | | GS1 | GS2 | GS3 | GS4 | GS5 | GS6 | GS7 | GS8 |
| Surface treatment layer | | Nil | Nil | Nil | Nil | Nil | Nil | Nil | Nil | Nil |
| Kneading workability | | A or B | B | A | A | A | A | A | A | A |
| Extrusion formability (dispersion in discharge amount (%)) | | 3 or less | 2.8 | 2.0 | 1.2 | 2.2 | 2.0 | 2.1 | 1.6 | 1.8 |
| Surface roughness (μm) | Contact needle tip end radius: 2 μm | — | 25.1 | 21.9 | 20.2 | 22.3 | 23.7 | 23.5 | 21.3 | 22.0 |
| | Contact needle tip end radius: 250 μm | — | 17.0 | 16.3 | 15.8 | 16.5 | 18.2 | 22.3 | 16.0 | 16.0 |
| Adhesion force (N/5 cm$^2$) | | 49.0 or less | 19.6 | 22.5 | 35.3 | 41.2 | 20.6 | 19.6 | 31.4 | 26.5 |
| Friction coefficient | Static friction coefficient | 2.0 or less | 1.45 | 1.49 | 1.78 | 1.74 | 1.33 | 1.28 | 1.83 | 1.57 |
| | Dynamic friction coefficient | 1.0 or less | 0.63 | 0.71 | 0.98 | 0.92 | 0.68 | 0.66 | 0.82 | 0.79 |
| Contact angle of water (°) | | 100 or more | 111 | 112 | 110 | 111 | 104 | 102 | 101 | 108 |
| Total evaluation | | A or B | B | A | A | A | A | A | A | A |

| | | Target | Specimen | | | | | | | |
| --- | --- | --- | --- | --- | --- | --- | --- | --- | --- | --- |
| | | | GS9 | GS10 | GS11 | GS12 | GS13 | GP1 | GP2 | GP3 |
| Surface treatment layer | | Nil | Nil | Nil | Nil | Nil | Nil | Nil | Nil | Nil |
| Kneading workability | | A or B | A | A | A | A | B | A | A | A |

TABLE 2-continued

| | | | | | | | | | | |
|---|---|---|---|---|---|---|---|---|---|---|
| Extrusion formability (dispersion in discharge amount (%)) | | 3 or less | 1.3 | 1.2 | 0.6 | 2.0 | 10 | 1.5 | 1.2 | 2.0 |
| Surface roughness (μm) | Contact needle tip end radius: 2 μm | — | 19.3 | 21.2 | 18.9 | 20.8 | 20.8 | 17.0 | 20.3 | 19.8 |
| | Contact needle tip end radius: 250 μm | — | 15.7 | 15.8 | 15.4 | 16.0 | 16.5 | 10.3 | 10.3 | 11.9 |
| Adhesion force (N/5 cm$^2$) | | 49.0 or less | 45.1 | 37.2 | 47.0 | 24.5 | 18.6 | 196.0 | 94.1 | 55.9 |
| Friction coefficient | Static friction coefficient | 2.0 or less | 1.79 | 1.95 | 1.99 | 1.52 | 1.12 | 3.50 | 2.53 | 2.50 |
| | Dynamic friction coefficient | 1.0 or less | 0.89 | 0.98 | 0.98 | 0.83 | 0.65 | 1.70 | 1.86 | 1.83 |
| Contact angle of water (°) | | 100 or more | 110 | 93 | 95 | 110 | 120 | 90 | 90 | 110 |
| Total evaluation | | A or B | A | B | B | A | B | C | C | C |

| | | | Specimen | | | | | | | |
|---|---|---|---|---|---|---|---|---|---|---|
| | | Target | GP4 | GP5 | GP6 | GP7 | GP8 | GP9 | GP10 | GP11 |
| Surface treatment layer | | Nil | Present | Present | Nil | Nil | Nil | Nil | Nil | Nil |
| Kneading workability | | A or B | A | A | A | C | A | A | A | A |
| Extrusion formability (dispersion in discharge amount (%)) | | 3 or less | 1.5 | 1.5 | 0.8 | 3.5 | 1.5 | 2.0 | 0.9 | 0.8 |
| Surface roughness (μm) | Contact needle tip end radius: 2 μm | — | — | — | 18.3 | 26.7 | 20.9 | 23.3 | 13.5 | 12.5 |
| | Contact needle tip end radius: 250 μm | — | — | — | 14.0 | 18.1 | 15.6 | 25.2 | 13.8 | 13.9 |
| Adhesion force (N/5 cm$^2$) | | 49.0 or less | 147.0 | 8.8 | 54.9 | 19.6 | 54.9 | 15.7 | 122.5 | 127.4 |
| Friction coefficient | Static friction coefficient | 2.0 or less | 3.20 | 1.62 | 2.13 | 1.42 | 2.13 | 1.23 | 3.70 | 3.80 |
| | Dynamic friction coefficient | 1.0 or less | 1.50 | 0.58 | 1.07 | 0.61 | 1.03 | 0.62 | 2.00 | 2.20 |
| Contact angle of water (°) | | 100 or more | 103 | 107 | 110 | 112 | 108 | 94 | 110 | 109 |
| Total evaluation | | A or B | C | A | C | C | C | B | C | C |

[Comparative Example Containing No Thermally Expandable Capsule]

First, as shown in Table 2, the rubber compounds P1 to P5 in which the carbon 80 nm, the softener and the foaming agent were blended while no thermo-expansive capsules was blended were good in workability. However, of the specimens using the above respective rubber compounds, the specimens respectively using the rubber compounds P1 and P2 were seen to be low in adhesion characteristics, sliding characteristics and water repellency although the adding amount of the carbon 80 nm and the softener were adjusted.

Additionally, the specimen GP3 using the rubber compound P3 which was formed by blending the silicone compound to the same composition as the rubber compound P2 could obtain a sufficient water repellency; however, it was seen to be low in adhesion resistance and sliding characteristics. Further, the specimens GP4 (having a thickness of the surface treatment layer of 2 μm) and GP5 (having a thickness of the surface treatment layer of 5 μm) using the same composition as the rubber compound P1 could obtain a sufficient water repellency under the effect of the surface treatment layer; however, they are seen to be low in adhesion resistance and sliding characteristics if the thickness of the above-mentioned surface treatment layer was not sufficient as the specimen GP5.

[Comparative Example Containing Thermo-expansive Capsules]

The rubber compound P6 which was similar in composition to the rubber compound P3, contained the thermo-expansive capsules and was general in blending amount of the carbon 80 nm was good in workability. The specimen GP6 using the rubber compound P6 could a sufficient water repellency; however, it was seen to be low in adhesion resistance and sliding characteristics.

Additionally, the above-mentioned rubber compound P7 which was similar in composition to the above-mentioned rubber compound P6 and very low in blending amount of the carbon 80 nm was the worst in workability; however, the specimen GP7 using the rubber compound P7 was seen to be good in adherence resistance and sliding characteristics.

[Comparative Example Much in Blending Amount of Thermo-expansive Capsules and Softener]

The rubber compound P8 which was similar in composition to the rubber compound P6, relatively little in blending amount of the carbon 80 nm and relatively much in blending amount of the softener was good in workability. The specimen GP8 using the rubber compound P8 could obtain a good water repellency; however, it was seen to be low in adherence resistance and sliding characteristics.

Additionally, the rubber compound P9 which was similar in composition to the rubber compound P6, relatively little in blending amount of the carbon 80 nm and relatively much in blending amount of the thermo-expansive capsules. The specimen GP9 using the rubber compound P9 could obtain good adherence resistance and sliding characteristics; however, it was seen to be low in water repellency.

[Comparative Example Adjusted in Particle Diameter of Carbon Black]

The rubber compounds P10 and P11 which were similar in composition to the rubber compound P3 and respectively contained the blended carbon 45 nm and the blended carbon 60 nm were good in workability. The specimens GP10 and GP11 using respectively the rubber compounds P10 and P11 could obtain a good repellency; however, it was seen to be low in adherence resistance and sliding characteristics.

[Example Containing Thermo-expansive Capsules and Using Carbon Black Having Large Particle Diameter]

The rubber compounds S1 to S9 contained the carbon 80 nm or the carbon 60 nm in an amount ranging from 60 phr to 120 phr, the softener in an amount ranging from 80 phr to 100 phr, the thermo-expansive capsules in an amount ranging from 2 phr to 10 phr, the silicone compound 2 phr to 20 phr, and the foaming agent. The respective rubber compounds S1 to S9 were good in workability. The specimens GS1 to GS9 using respectively the rubber compounds S1 to S9 were seen to be good in water repellency, adherence resistance and sliding characteristics.

Additionally, the rubber compounds S10 to S12 which were respectively similar in composition to the rubber compounds S3, S4 and S5 and did not contain the blended silicone compound and the blended organic foaming agent were good in workability. The specimens GS10 to GS12 using respectively the rubber compounds S10 to S12 were seen to be good in adherence resistance and sliding characteristics. Furthermore, the specimens GS10 and GS11 which did not contain the silicone compound were seen to be inferior in water repellency as compared with the specimen GS12.

Furthermore, the rubber compound S13 which was similar in composition to the rubber compound S2 and contained the blended silicone compound in an amount of 40 phr was low in workability. However, the specimen GS13 using the rubber compound S13 were seen to be good in water repellency, adherence resistance, and sliding characteristics.

Figure 6:
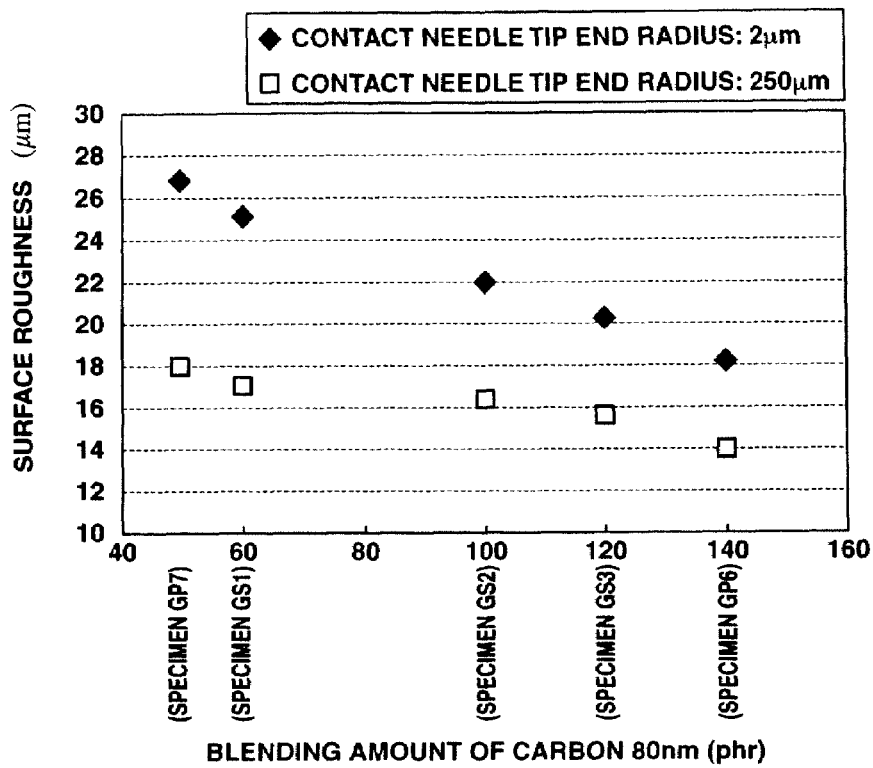
FIG. 6 is a graph showing a surface roughness in terms of a blending amount of carbon 80 nm in connection with specimens of Examples and Comparative Examples.

Here, the measured results in surface roughness of the specimens GP6, GP7 and GS1 to GS3 using respectively the rubber compounds each of which is 80 phr and 2 phr respectively in blending amounts of the softener and the thermo-expansive capsules are shown in FIG. 6 which is graph of the characteristics of the surface roughness in terms of the blending amount of the carbon 80 nm. From this characteristics graph shown in FIG. 6, it was revealed that the uneven surface derived from the thermal expansion of the thermo-expansive capsules was formed at the surface of each of the above-mentioned specimens GS1 to GS3, GP6 and GP7, and the rough surface was formed at the uneven surface derived from the thermal expansion of the thermo-expansive capsules; and there is a correlation between the blending amount of the carbon 80 nm and the surface roughness of the rough surface derived from the carbon particles of the carbon black.

Figure 7:
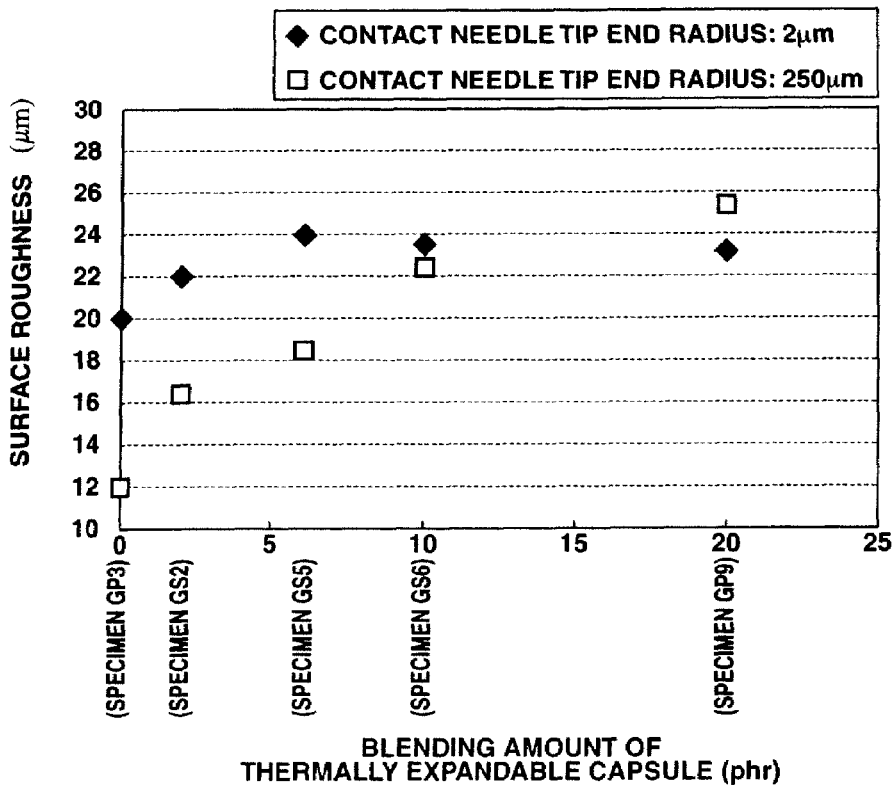
FIG. 7 is a graph showing a surface roughness in terms of a blending amount of a thermo-expansive capsules in connection with specimens of Examples and Comparative Examples.

Additionally, the measured results in surface roughness of the specimens GP3, GP9, GS2, GS5 and GS6 using respectively the rubber compounds each of which is 80 phr and 100 phr respectively in blending amounts of the softener and the carbon 80 nm are shown in FIG. 7 which is graph of the characteristics of the surface roughness in terms of the blending amount of the thermo-expansive capsules. From this characteristics graph shown in FIG. 7, it has been revealed that there is a correlation between the blending amount of the thermo-expansive capsules and the uneven surface derived from the thermal expansion of the thermo-expansive capsules.

Similarly to the above-mentioned rubber compounds S1 to S13, a sufficient workability could be obtained if a rubber compound contained at least blended elastomeric polymer, carbon black, softener and thermo-expansive capsules, in which the carbon black had an arithmetic average particle diameter of not smaller than 60 nm (for example, the carbon 60 nm and the carbon 80 nm) and a blending amount ranging from more than 50 phr to 100 phr; the softener had a blending amount of not more than 100 phr; and the thermo-expansive capsules had a blending amount ranging from 1 phr to 10 phr.

It was confirmed that a specimen using the rubber compound was good in water repellency, adherence resistance, and sliding characteristics.

As discussed above, according to the present invention, the rough surface derived from the carbon particles of the carbon black is obtained at the uneven surface derived from the thermal expansion of the thermo-expansive capsules, and the contact area between the surface of the polymer-extruded article and the object to be used becomes small. As a result, for example, coating of a surface treatment agent and the like becomes unnecessary to be made, thereby obtaining sufficient sliding characteristics, adherence resistance, water repellency and the like without degrading a productivity. Accordingly, by applying the polymer-extruded article to a weather strip and the like for an automotive vehicle, the weather strip can sufficiently exhibit the functions to be required for it.

Although the present invention has been discussed on the described embodiments, it will be understood for the those skilled in the art that it is possible to made a variety of modifications and corrections to the embodiments without departing from the spirit and scope of the invention. It is the matter of course that such modifications and corrections are within the scope of claims of the present invention.

The entire contents of Japanese Patent Application No. 2005-78313, filed Mar. 18, 2005, are incorporated herein by reference.

What is claimed is:

1. A polymeric composition used for a polymer-extruded article produced by extrusion and vulcanization, comprising:
    ethylene-α-olefin-nonconjugated polyene copolymer in an amount of 100 phr;
    carbon black in an amount ranging from more than 50 to 120 phr, the carbon black having an arithmetic average particle diameter of not smaller than 60 nm;
    a softener in an amount of not more than 100 phr; and
    thermo-expansive capsules in an amount ranging from 1 to 10 phr; and
    a silicone compound in an amount of 2 to 30 phr.

2. A polymeric composition as claimed in claim 1, wherein the silicone compound is in an amount of 2 to 20 phr.

3. A polymeric composition as claimed in claim 2, wherein the silicone compound is in an amount of 2 to 10 phr.

4. A polymeric composition used for a polymer-extruded article produced by extrusion and vulcanization, comprising:
    ethylene-α-olefin-nonconjugated polyene copolymer in an amount of 100 phr;
    carbon black in an amount ranging from more than 50 to 120 phr, the carbon black having an arithmetic average particle diameter of not smaller than 60 nm;
    a softener in an amount of not more than 100 phr; and
    thermo-expansive capsules in an amount ranging from 1 to 10 phr; and
    a silicone compound.

5. A polymeric composition as claimed in claim 4, wherein the silicone compound is in an amount of 2 to 20 phr.

6. A polymeric composition as claimed in claim 5, wherein the silicone compound is in an amount of2 to 10 phr.

7. A polymeric composition as claimed in claim 4, wherein the silicone compound is present in the composition in an amount of 30 phr or less.

* * * * *